United States Patent
Chou et al.

(10) Patent No.: US 8,908,370 B2
(45) Date of Patent: Dec. 9, 2014

(54) ELECTRONIC DEVICE

(71) Applicants: Che-Yu Chou, New Taipei (TW); Qun Huang, Shenzhen (CN); Tai-Shan Zhu, Shenzhen (CN); Wen-Chih Lan, New Taipei (TW); Tao Jiang, Shenzhen (CN); Hai-Qian Ge, Shenzhen (CN); Jun-Liang Zhang, Shenzhen (CN); Wei-Wei Yu, Shenzhen (CN); Hua-Yong Wang, Shenzhen (CN); Ji-Bing Guo, Shenzhen (CN); Zhou Chen, Shenzhen (CN); Zhi-Jun Shi, Shenzhen (CN)

(72) Inventors: Che-Yu Chou, New Taipei (TW); Qun Huang, Shenzhen (CN); Tai-Shan Zhu, Shenzhen (CN); Wen-Chih Lan, New Taipei (TW); Tao Jiang, Shenzhen (CN); Hai-Qian Ge, Shenzhen (CN); Jun-Liang Zhang, Shenzhen (CN); Wei-Wei Yu, Shenzhen (CN); Hua-Yong Wang, Shenzhen (CN); Ji-Bing Guo, Shenzhen (CN); Zhou Chen, Shenzhen (CN); Zhi-Jun Shi, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 204 days.

(21) Appl. No.: 13/631,884

(22) Filed: Sep. 29, 2012

(65) Prior Publication Data
US 2013/0148308 A1 Jun. 13, 2013

(30) Foreign Application Priority Data
Dec. 7, 2011 (CN) .......................... 2011 1 0402757

(51) Int. Cl.
*G06F 1/16* (2006.01)
*H04M 1/02* (2006.01)

(52) U.S. Cl.
CPC .............. *H04M 1/0237* (2013.01); *H04M 1/02* (2013.01)
USPC .................................... 361/679.55; 455/575.4

(58) Field of Classification Search
CPC .............................. H04M 1/0237; H04M 1/02
USPC .................................... 361/679.55; 455/575.4
See application file for complete search history.

(56) References Cited

U.S. PATENT DOCUMENTS

| 7,065,835 | B2 * | 6/2006 | Kuramochi | 16/357 |
| 7,529,571 | B2 * | 5/2009 | Byun et al. | 455/575.4 |
| 7,611,113 | B2 * | 11/2009 | Lai | 248/286.1 |
| 7,865,151 | B2 * | 1/2011 | Cho | 455/90.3 |
| 7,962,185 | B2 * | 6/2011 | Hung | 455/575.1 |
| 8,014,845 | B2 * | 9/2011 | Murakoso et al. | 455/575.4 |
| 8,032,192 | B2 * | 10/2011 | Park | 455/575.4 |
| 8,074,323 | B2 * | 12/2011 | Lin | 16/345 |
| 8,155,718 | B2 * | 4/2012 | Byun et al. | 455/575.4 |
| 8,164,889 | B2 * | 4/2012 | Duan et al. | 361/679.21 |
| 8,164,890 | B2 * | 4/2012 | Wu et al. | 361/679.21 |
| 8,190,219 | B2 * | 5/2012 | Park et al. | 455/575.4 |
| 8,195,255 | B2 * | 6/2012 | Cho et al. | 455/575.4 |
| 8,199,475 | B2 * | 6/2012 | Yeh et al. | 361/679.27 |
| 8,233,276 | B2 * | 7/2012 | Wu et al. | 361/679.55 |
| 8,248,788 | B2 * | 8/2012 | Wu et al. | 361/679.55 |
| 8,254,104 | B2 * | 8/2012 | Wu et al. | 361/679.3 |

(Continued)

*Primary Examiner* — Lisa Lea Edmonds
(74) *Attorney, Agent, or Firm* — Novak Druce Connolly Bove + Quigg LLP

(57) ABSTRACT

An electronic device includes a body, a cover coupled to the body, and a sliding mechanism. The sliding mechanism includes a rotating component, a first locking component, and a second locking component. When the second locking component moves to a locked position, the second locking component engages with the first locking component to lock the cover to the body. When the second locking component moves to an unlocked position, the first locking component disengages from the second locking component, to allow the rotating component to rotatably drive the cover to be opened.

20 Claims, 5 Drawing Sheets

(56) References Cited

U.S. PATENT DOCUMENTS

| | | | |
|---|---|---|---|
| 8,284,554 B2 * | 10/2012 | Stone et al. | 361/679.56 |
| 8,363,391 B2 * | 1/2013 | Kim et al. | 361/679.01 |
| 8,364,215 B2 * | 1/2013 | Jung et al. | 455/575.4 |
| 8,385,063 B2 * | 2/2013 | Zhu et al. | 361/679.58 |
| 8,422,204 B2 * | 4/2013 | Wang | 361/679.01 |
| 8,473,015 B2 * | 6/2013 | Kim et al. | 455/575.3 |
| 8,559,623 B2 * | 10/2013 | Chen et al. | 379/433.12 |
| 8,564,936 B2 * | 10/2013 | Ejima | 361/679.01 |
| 8,593,801 B2 * | 11/2013 | Minowa | 361/679.3 |
| 2006/0211460 A1 * | 9/2006 | Jeong et al. | 455/575.4 |
| 2007/0297267 A1 * | 12/2007 | Han et al. | 365/230.05 |
| 2008/0161075 A1 * | 7/2008 | Kim et al. | 455/575.4 |
| 2009/0036181 A1 * | 2/2009 | Lee | 455/575.4 |
| 2010/0009729 A1 * | 1/2010 | Maatta | 455/575.4 |
| 2010/0285852 A1 * | 11/2010 | Stephenson | 455/575.4 |
| 2011/0143824 A1 * | 6/2011 | Laine | 455/575.4 |
| 2012/0195677 A1 * | 8/2012 | Huang et al. | 403/53 |

\* cited by examiner

ELECTRONIC DEVICE

BACKGROUND

1. Technical Field

The present disclosure relates to electronic devices; and particularly to an electronic device with a sliding mechanism.

2. Description of Related Art

Electronic devices (such as mobile phones, computers, and music players) with a body and a cover slideable relative to the body are ubiquitous. Typical sliding cover includes two sliding rails. The body defines two sliding grooves engaging with the two sliding rails. Thereby the user can manually slide the cover relative to the body to open the electronic device. However, this manual operation is inconvenient.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
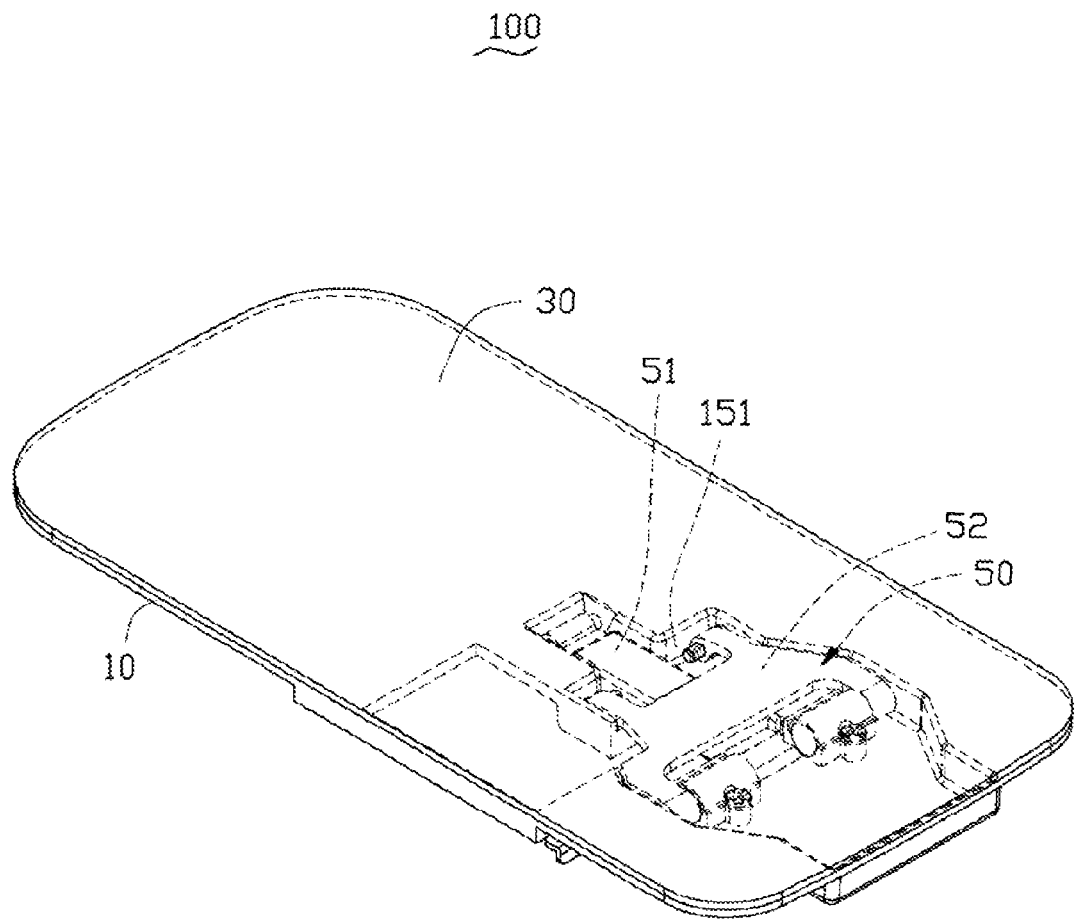
FIG. 1 is an isometric view of an electronic device in a closed state in an embodiment with a sliding mechanism.

FIG. 1 illustrates an embodiment of an electronic device 100. The electronic device 100 includes a body 10, a cover 30 opposite to the body 10, and a sliding mechanism 50. The sliding mechanism 50 is adapted to connect the cover 30 to the body 10, for allowing the cover 30 to be opened and closed relative to the body 10. In this embodiment, the electronic device 100 is a mobile phone with a sliding cover. In other embodiments, the electronic device 100 may be a computer or a music player.

Figure 2:
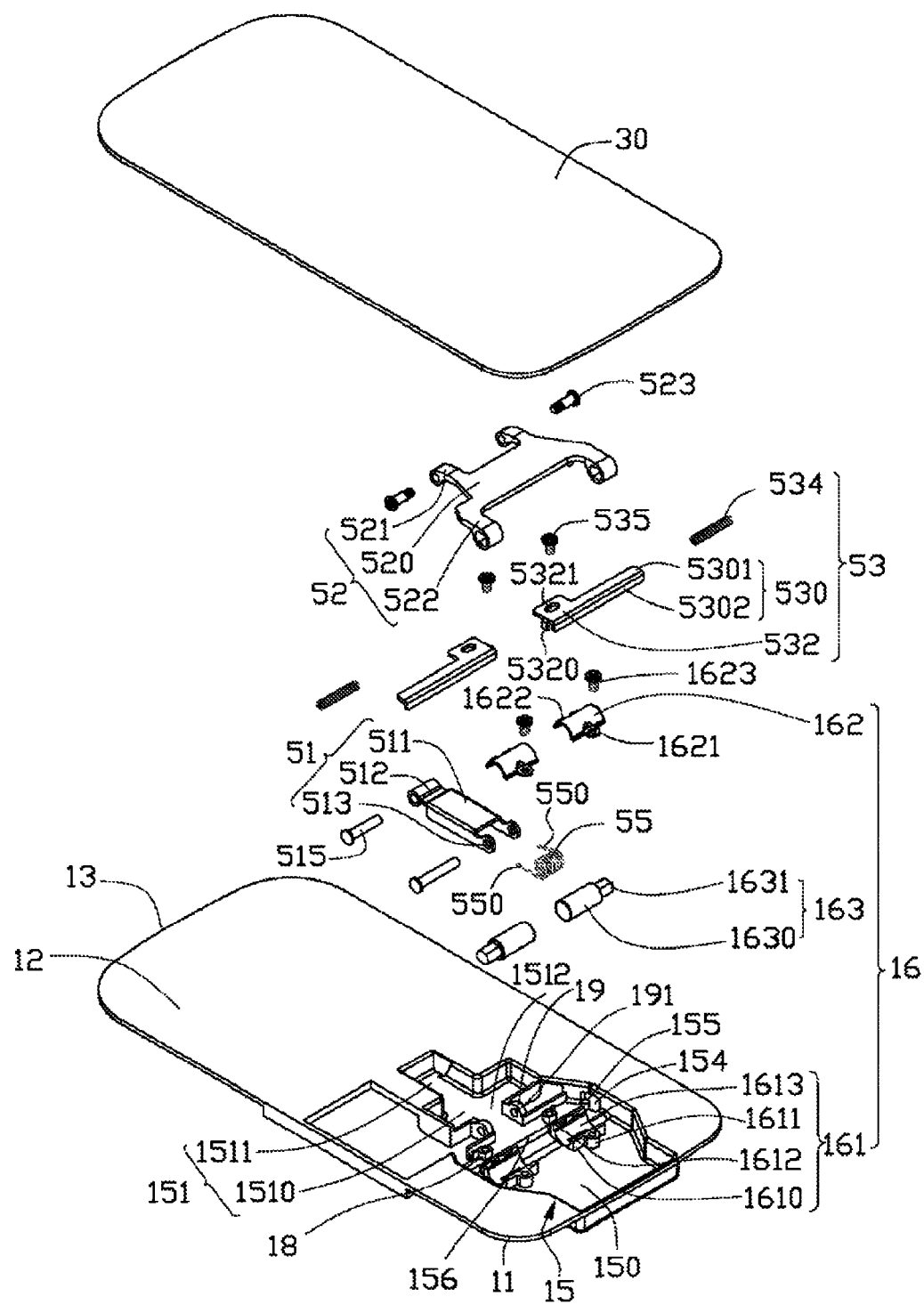
FIG. 2 is a partial, exploded view of the electronic device of FIG. 1.
Figure 3:
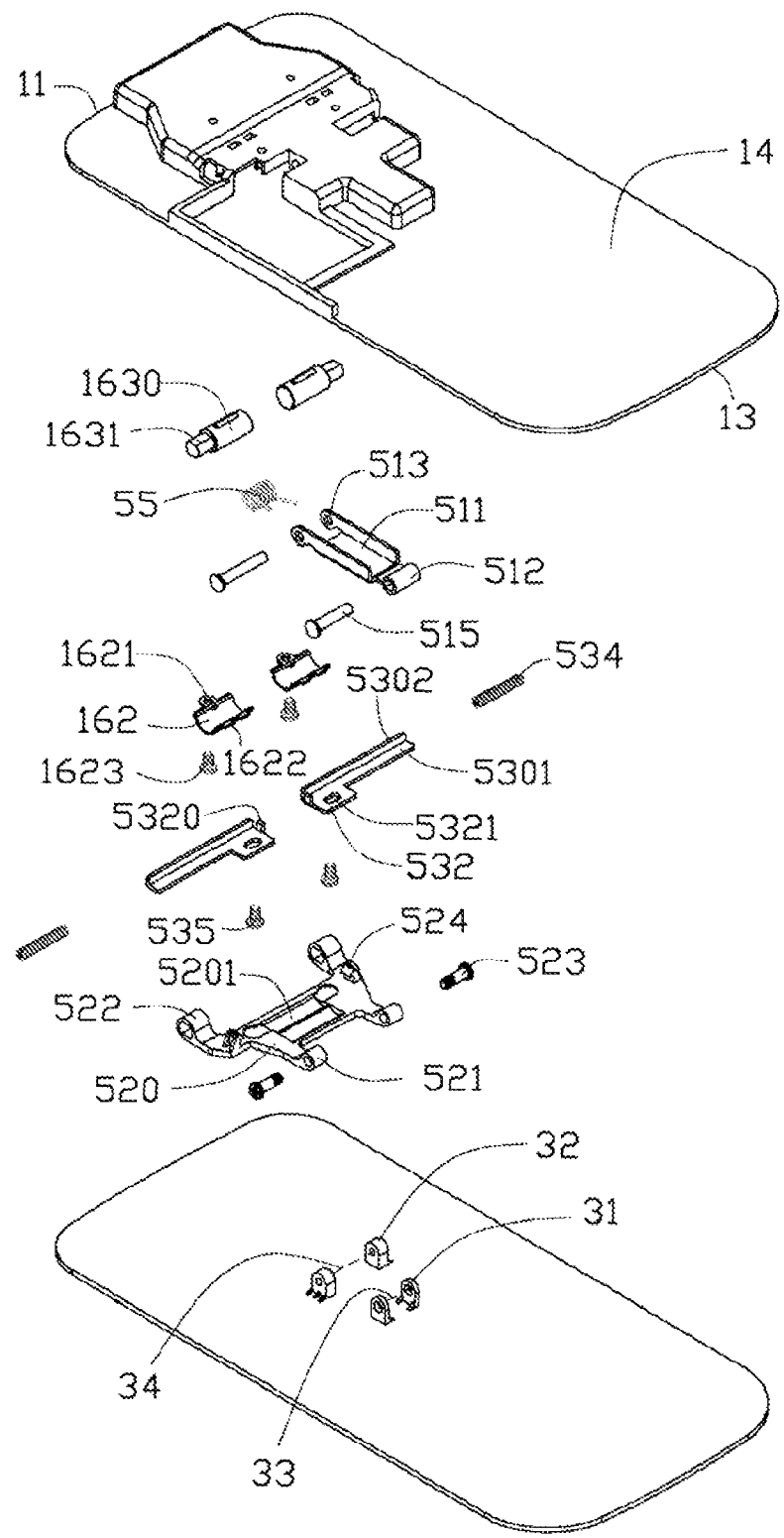
FIG. 3 is similar to FIG. 2, but viewed from another aspect.

FIGS. 2 and 3 illustrate the body 10 of the embodiment. The body 10 is substantially rectangular-plated. The body 10 includes a first sidewall 11, a second sidewall 13 opposite to the first sidewall 11, a first surface 12, and a second surface 14 opposite to the first surface 12. When the cover 30 covers the body 10, the first surface 12 faces the cover 30. The body 10 defines a receiving groove 15. When viewed from the first surface 12, the receiving groove 15 is recessed in the first surface 12; when viewed from the second surface 14, the receiving groove 15 protrudes out of the second surface 14.

The receiving groove 15 includes a first receiving portion 150 and a second receiving portion 151 adjacent to the first receiving portion 150. The first receiving portion 150 is adjacent to the first sidewall 11. The first receiving portion 150 defines two through holes 154 and a sliding slot 156. The two through holes 154 are defined on opposite sidewalls of the first receiving portion 150 and are symmetrical to each other. Two spaced fixing posts 155 protrude from the bottom of the first receiving portion 150. The sliding slot 156 is arranged between the two fixing posts 155. The line joining the two fixing posts 155 is aligned substantially parallel with the first sidewall 11.

The second receiving portion 151 is substantially T-shaped, and defines a first recess 1510 and a second recess 1511. The first recess 1510 extends in a direction parallel to the first sidewall 11, and defines an opening 1512 communicating with the first receiving portion 150. The second recess 1511 is perpendicular to and communicates with the first recess 1510. Thereby, the first receiving portion 150, the first recess 1510, and the second recess 1511 communicate with each other.

The body 10 further includes two spaced hinge components 16, two spaced positioning posts 18 and two spaced shaft portions 19 which all protrude at interval from the bottom of the first receiving portion 150.

The two hinge components 16 are arranged between the first sidewall 11 and the sliding slot 156. The axis of the two hinge components 16 is parallel to the first sidewall 11. Each hinge component 16 includes a bottom cover 161, a top cover 162, and a shaft 163. The bottom cover 161 includes a main body 1610, a protruding post 1611 and a fixing plate 1612. The main body 1610 is substantially rectangular, and defines a semicircular concave portion 1613. The protruding post 1611 protrudes from a side near the first sidewall 11 of the main body 1610. The fixing plate 1612 extends from a side opposite the protruding post 1611 of the main body 1610, and protrudes out of a surface of the main body 1610 opposite to the bottom of the first receiving portion 150. The top cover 162 engages with the bottom cover 161 to define a space for receiving the shaft 163. A positioning portion 1621 and an inserting portion 1622 are secured to opposite ends of the top cover 162. The positioning portion 1621 corresponds to the protruding post 1611. The inserting portion 1622 corresponds to the fixing plate 1612 and is capable of being inserted into the fixing plate 1612. The shaft 163 is arranged between the bottom cover 161 and the top cover 162. The shaft 163 includes a first rotating portion 1630 and a second rotating portion 1631 connecting to the first rotating portion 1630. The first rotating portion 1630 is rotatably received in the concave portion 1613. The second rotating portion 1631 protrudes out of the concave portion 1613.

The two positioning posts 18 are arranged on a side of the sliding slot 156 opposite to the two hinge components 16, and are aligned parallel to the first sidewall 11. The two shaft portions 19 are arranged between the two positioning posts 18 and the second receiving portion 151. Each shaft portion 19 defines a pivoting hole 191. The pivoting holes 191 are coaxial to each other and are aligned parallel to the first sidewall 11.

The cover 30 covers the first surface 12 of the body 10, and includes two spaced first connecting portion 31 and two spaced second connecting portions 32. A first line 33 connecting the two first connecting portions 31 is parallel to and shorter than a second line 34 connecting the two second connecting portions 32. A predetermined gap is formed between the first line 33 and the second line 34. Thus, the two first connecting portions 31 cooperate with the two second connecting portions 32 to form a trapezium.

The sliding mechanism 50 is used for slidably connecting the cover 30 to the body 10. The sliding mechanism 50 includes a rotating component 51, a first locking component 52, two second locking portions 53 and a first elastic component 55.

The rotating component 51 is rotatably connected between the two first connecting portions 31 and the two shaft portions 19. The rotating component 51 includes a plate body 511, a first connecting arm 512 and two second connecting arms 513. The plate body 511 is substantially rectangle. The first and second connecting arms 512, 513 extend from opposite ends of the plate body 511. The first connecting arm 512 is rotatably coupled to the two first connecting portions 31. The two second connecting arms 513 are spaced apart from each other and are rotatably coupled to the two shaft portions 19.

The first locking component 52 is rotatably connected to the two second connecting portions 32 and the two second rotating portions 1631. The first locking component 52 includes a main arm 520, two first branch arms 521, two second branch arms 522, and two first locking portions 524 (see FIG. 3). A surface of the main arm 520 facing the body 10 defines a receptacle portion 5201. The first and second branch arms 521, 522 extend from opposite ends of the main arm 520. The two first branch arms 521 are rotatably coupled to the two second connecting portions 32. The two second branch arms 522 are rotatably coupled to the two second rotating portions 1631. The two first locking portions 524 protrude from the surface of the main arm 520 facing the body 10 and are arranged opposite sides to the receptacle portion 5201. In the embodiment, the two first locking portions 524 are hooks. In other embodiments, the shape and position of the two first locking portions 524 may be changed, for example, the two first locking portions 524 may protrude from the body 10 or the cover 30.

The two second locking components 53 extend through the corresponding through holes 154 and are slidably received in the sliding slot 156. Each first locking component 53 includes an operating portion 530, a second locking portion 532, and a second elastic component 534.

The cross-section of the operating portion 530 is substantially L-shaped, and includes a first resisting portion 5301 and a second resisting portion 5302 perpendicular to the first resisting portion 5301. The second locking portion 532 extends from a rim of the first resisting portion 5301 opposite to the second resisting portion 5302. The second locking portion 532 defines an elongated positioning hole 5321, allowing a fastening component 535 to extend there-through. The length of the positioning hole 5321 parallel to the first sidewall 11 is larger than the corresponding length of the fastening component 535. Thus, the second locking component 53 is movably coupled to the body 10. Two narrow strip-shaped fixing portions 5320 form on opposite ends of the two operating portions 530 in a direction parallel to the first sidewall 11. Each fixing portion 5320 perpendicularly extends from a rim of the first resisting portion 5301 perpendicular to the second locking portion 532. Each second elastic component 534 abuts the first and second resisting portions 5301, 5302. Ends of each second elastic component 534 are respectively secured to the fixing portion 5320 and the corresponding fixing post 155, providing an elastic force to move the second locking components 53 in reverse directions in order to protrude out of the corresponding through holes 154.

The first elastic component 55 in the embodiment is a torsion spring, and includes two arms 550. The first elastic component 55 is arranged between the two second connecting arms 513. The two arms 550 respectively abut the body 10 and the plate body 511 providing an elastic force to rotate the rotating component 51 away from the body 10 when the rotating component 51 is released.

Figure 4:
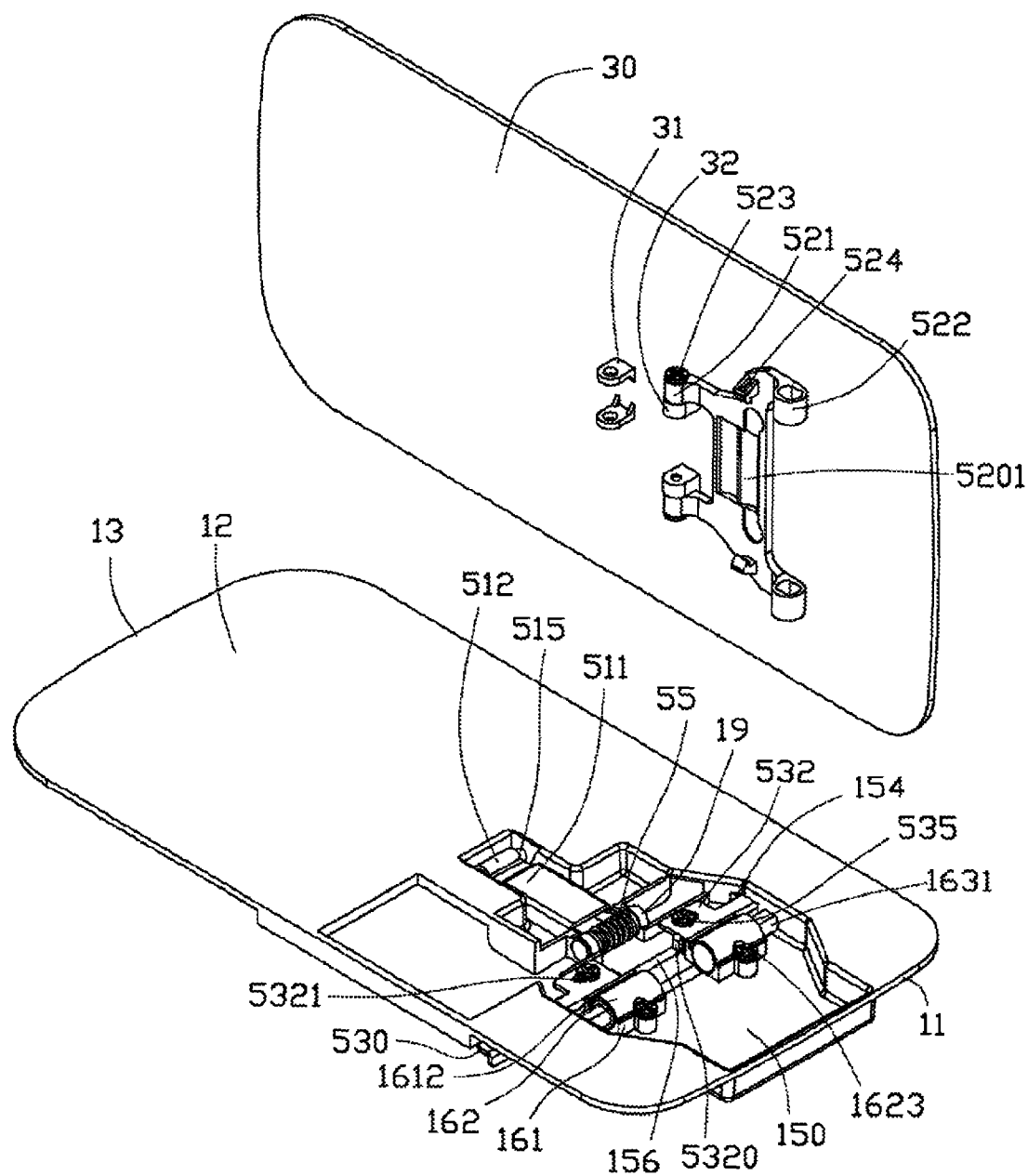
FIG. 4 is a partial assembled view of the sliding mechanism of FIG. 2.

Further referring to FIG. 4, in assembly, the two shafts 163 are received in the corresponding concave portions 1613, with the second rotating portions 1631 being exposed out of the corresponding concave portions 1613. The two top covers 162 are fixed to the corresponding bottom covers 161 via two first latching components 1623.

Two operating portions 530 extend through and protrude out of the corresponding through holes 154. The two second resisting portions 5302 are slidably received in the sliding slot 156. The two second locking portions 532 are aligned with the corresponding positioning post 18. The two fastening components 535 extend through the corresponding positioning holes 5321 for movably connecting the corresponding second locking component 53 to the body 10. The two second elastic components 534 are arranged between the corresponding fixing portions 5320 and the fixing posts 155. In this state, the two second locking components 53 are capable of moving between a locking position for engaging with the corresponding second locking portions 524 and protruding out of the corresponding through holes 154, and an unlocking position disengaging with the corresponding second locking portions 524 and being retracted into the corresponding through holes 154.

The two second connecting arms 513 of the rotating component 51 are received between the two shaft portions 19. The first elastic component 55 is arranged between the two second connecting arms 513. A positioning pin 515 extends through the two pivoting holes 191, the two second connecting arms 513 and the first elastic component 55, allowing the rotating component 51 to rotatably connect to the body 10. Another positioning pin 515 extends through the two first connecting portions 31 and the first connecting arm 512, allowing the rotating component 51 to rotatably connect to the cover 30.

The two first branch arms 521 of the first locking component 52 are rotatably connected to the corresponding second connecting portions 32 via two second latching components 523. The two second branch arms 522 are rotatably connected to the corresponding second rotating portions 1631, with the two second locking portions 524 and the receptacle portion 5201 facing the body 10. Thus, the first locking component 52 is rotatably coupled between the body 10 and the cover 30.

Further referring to FIG. 1, when the cover 30 wholly covers on the body 10, the rotating component 51 is received in the second receiving portion 151. A part of the first locking component 52 covers on the rotating component 51, allowing the two first locking portions 524 and the receptacle portion 5201 to face the body 10. In this state, the first elastic component 55 is compressed, and the two second locking portions 524 are locked to the corresponding first locking portions 532 to prevent the cover 30 from being opened.

Figure 5:
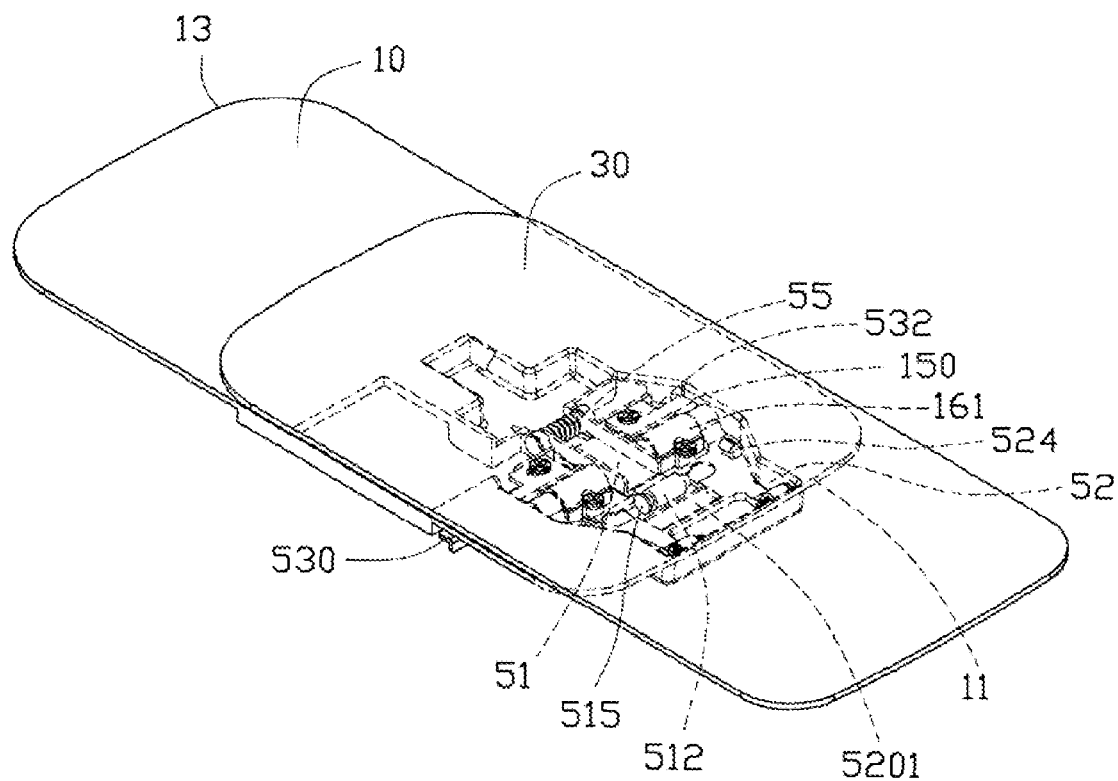
FIG. 5 is a side view of the electronic device in an open state shown in FIG. 1.

Referring to FIG. 5, to open the cover 30 relative to the body 10, two reverse external forces are applied to the corresponding operating portions 530 pushing the two second locking portions 532 toward each other in a first direction parallel to the first sidewall 11. Thus, the two second locking portions 532 disengage with the corresponding first locking portions 524. The first elastic component 55 rebounds to raise the rotating component 51 and the first locking component 52. In this state, the rotating component 51 and the first locking component 52 rotate in the same direction, and cooperate to drive the cover 30 to slide relative to the body 10 in a second direction perpendicular the first sidewall 11. The two shafts 163 are rotated to allow the cover 30 to steadily slide relative to the body 10. When the cover 30 is wholly opened relative to the body 10, the rotating component 51 rotates 180 degrees around the positioning pin 515, and the first locking component 52 rotates 180 degrees around the two shafts 163. In this state, the first locking component 52 is received in the first receiving portion 150, and the first connecting arm 512 is received in the receptacle portion 5201.

To close the cover 30 to the body 10, an external force is applied to drive the cover 30 to slide relative to the body 10 in a direction reverse to the second direction. In this state, the rotating component 51 rotates around the positioning pin 515, and the first locking component 52 rotates around the two second rotating portions 1631. The cover 30 is pressed down to drive the two second locking portions 524 to be locked to the corresponding first locking portions 532 (in the unlocked position), and the first elastic component 55 is compressed again, when the cover 30 closes to the body 10.

Although information and the advantages of the present embodiments have been set forth in the foregoing description, together with details of the structures and functions of the present embodiments, the disclosure is illustrative only; changes may be made in detail, especially in the matters of shape, size, and arrangement of parts within the principles of the present embodiments to the full extent indicated by the broad general meaning of the terms in which the appended claims are expressed.

What is claimed is:

1. An electronic device, comprising:
a body;
a cover coupled to the body; and
a sliding mechanism connecting the cover to the body and for allowing the cover to be closed and opened relative to the body, the sliding mechanism comprising:
a rotating component rotatably arranged between the body and the cover;
a first locking component coupled to the cover; and
a second locking component secured to the body and capable of being moved between a locking position for locking the cover to the body and an unlocking position for allowing the cover to be unlocked from the body;
wherein when the second locking component moves to the locking position, the second locking component engages with the first locking component to lock the cover to the body; when the second locking component moves to the unlocking position, the first locking component disengages from the second locking component, to allow the rotating component to rotate to drive the cover to be opened.

2. The electronic device as claimed in claim 1, wherein the sliding mechanism comprises a first elastic component arranged between the body and the cover, for providing an elastic force to rotate the rotating component away from the body when the rotating component moves to the unlocking position.

3. The electronic device as claimed in claim 2, wherein the first elastic component is arranged between the rotating component and the body.

4. The electronic device as claimed in claim 1, wherein opposite ends of the first locking component rotatably connect the body and the cover, when the cover is opened with respect to the body, the rotating component and the first locking component rotate with respect to the body in the same direction for slidingly opening the cover with respect to the body.

5. The electronic device as claimed in claim 1, wherein the second locking component comprises an operating portion and a second locking portion connected to the operating portion; the operating portion exposes out of the body and is capable of moving in a first direction for allowing the second locking portion to disengage from the first locking component.

6. The electronic device as claimed in claim 5, wherein the cover is capable of sliding with respect to the body in a second direction perpendicular to the first direction.

7. The electronic device as claimed in claim 5, wherein the second locking portion defines an elongated positioning hole, a fixing component extends through the positioning hole for allowing the second locking component to be movably coupled to the body.

8. The electronic device as claimed in claim 5, wherein the second locking component comprises a second elastic component, the second elastic component is arranged between the second locking component and the body for providing an elastic force to drive the second locking component to slide toward the body.

9. The electronic device as claimed in claim 8, wherein the second locking component comprises a fixing portion, the second elastic component is arranged between the fixing portion and the body in the first direction.

10. The electronic device as claimed in claim 1, wherein the body comprises a hinge component and a shaft received in the hinge component, the first locking component rotatably connects to the shaft; when the cover is opened with respect to the body, the shaft is capable of rotating and contacting to the hinge component for controlling the sliding speed of the cover.

11. An electronic device, comprising:
a body;
a cover coupled to the body; and
a sliding mechanism connecting the cover to the body and for allowing the cover to be closed and opened relative to the body, the sliding mechanism comprising:
a first locking component coupled to the cover; and
a second locking component secured to the body;
wherein when the first locking component engages with the second locking component, the cover is closed to the body; when the second locking component moves in a first direction with respect to the body, the first locking component disengages from the second locking component, and the cover is opened with respect to the body in a second direction perpendicular to the first direction.

12. The electronic device as claimed in claim 11, wherein the sliding mechanism comprises a rotating component arranged between the body and the cover; when the first locking component disengages from the second locking component, the rotating component rotates with respect to the body for driving the cover to open relative to the body.

13. The electronic device as claimed in claim 12, wherein the sliding mechanism comprises a first elastic component arranged between the body and the cover, for providing an elastic force to rotate the rotating component away from the body.

14. The electronic device as claimed in claim 13, wherein the first elastic component is arranged between the rotating component and the body.

15. The electronic device as claimed in claim 12, wherein opposite ends of the first locking component rotatably connect the body and the cover, when the cover is opened with respect to the body, the rotating component and the first locking component rotate with respect to the body in the same direction for slidingly opening the cover with respect to the body.

16. The electronic device as claimed in claim 11, wherein the second locking component comprises an operating portion and a second locking portion connected to the operating portion; the operating portion exposes out of the body and is capable of moving in the first direction for allowing the second locking portion to disengage from the first locking component.

17. The electronic device as claimed in claim 16, wherein the second locking portion defines an elongated positioning hole, a fixing component extends through the positioning hole for allowing the second locking component to movably couple to the body.

18. The electronic device as claimed in claim 17, wherein the second locking component comprises a second elastic component, the second elastic component is arranged between the second locking component and the body for providing an elastic force to drive the second locking component to slide toward the body.

19. The electronic device as claimed in claim 18, wherein the second locking component comprises a fixing portion, the second elastic component is arranged between the fixing portion and the body in the first direction.

20. The electronic device as claimed in claim 11, wherein the body comprises a hinge component and a shaft received in the hinge component, the first locking component rotatably connects to the shaft; when the cover is opened with respect to the body, the shaft is capable of rotating and contacting to the hinge component for controlling the sliding speed of the cover.

\* \* \* \* \*